U S008682273B2

(12) United States Patent
 Fillatre et al.

(10) Patent No.: US 8,682,273 B2
(45) Date of Patent: Mar. 25, 2014

(54) RF DIGITAL SPUR REDUCTION

(75) Inventors: Vincent Fillatre, Thaon (FR);
 Jean-Robert Tourret, Cormelles le Royal (FR)

(73) Assignee: NXP, B.V., Eindhoven (NL)

( * ) Notice: Subject to any disclaimer, the term of this patent is extended or adjusted under 35 U.S.C. 154(b) by 153 days.

(21) Appl. No.: 13/096,513

(22) Filed: Apr. 28, 2011

(65) Prior Publication Data

US 2011/0268164 A1 Nov. 3, 2011

(30) Foreign Application Priority Data

Apr. 30, 2010 (EP) .................................. 10290226

(51) Int. Cl.
 *H04B 1/06* (2006.01)
 *H04B 7/00* (2006.01)
(52) U.S. Cl.
 USPC ........... 455/259; 455/255; 455/256; 455/257; 455/258; 331/60; 341/155; 341/157
(58) Field of Classification Search
 USPC ................ 455/254–260, 192.1, 192.2, 196.1, 455/197.1, 197.3, 198.1, 199.1, 188.1, 455/189.1, 190.1, 179.1, 182.1, 182.2, 455/183.1, 183.2; 331/48–51, 59–61; 341/155, 157
 See application file for complete search history.

(56) References Cited

U.S. PATENT DOCUMENTS

| | | | |
|---|---|---|---|
| 6,192,228 B1 | 2/2001 | Agahi Kesheh et al. | |
| 6,415,001 B1 | 7/2002 | Li et al. | |
| 7,391,347 B2 * | 6/2008 | May et al. ..................... | 341/117 |
| 7,502,435 B2 * | 3/2009 | Hammes ....................... | 375/376 |
| 7,656,968 B2 * | 2/2010 | Lowe et al. ................... | 375/316 |
| 8,130,971 B2 * | 3/2012 | Werner ......................... | 381/72 |
| 8,160,117 B1 * | 4/2012 | Courcy ......................... | 375/130 |
| 8,280,340 B2 * | 10/2012 | Xuan et al. .................... | 455/333 |
| 2003/0100280 A1 | 5/2003 | Kusbel et al. | |
| 2004/0229574 A1 | 11/2004 | Pfann et al. | |
| 2005/0070325 A1 | 3/2005 | Bellaouar et al. | |
| 2005/0265483 A1 | 12/2005 | Erdogan | |
| 2010/0073052 A1 * | 3/2010 | Choi et al. .................... | 327/157 |

FOREIGN PATENT DOCUMENTS

| | | |
|---|---|---|
| EP | 0803997 A | 10/1997 |
| EP | 1732316 A | 12/2006 |
| WO | 99/49582 A | 9/1999 |
| WO | 03/075465 A | 9/2003 |

OTHER PUBLICATIONS

Extended European Search Report for EP10290226.9-2411 dated Oct. 12, 2010.
Extended European Search Report for EP10290229.3-1246 dated Dec. 14, 2010.

* cited by examiner

*Primary Examiner* — Tuan A Tran

(57) ABSTRACT

Digital spur reduction in which spurs are kept outside selected channels of interest, with illustrative embodiments relating to an integrated radiofrequency transceiver circuit having digital and analogue components, the circuit having a radiofrequency signal receiver with a local oscillator signal generator configured to provide a local oscillator signal at a frequency $f_{LO}$ and a mixer configured to combine an input radiofrequency signal with the local oscillator signal to produce an intermediate frequency signal; and a clock signal generator configured to generate a digital clock signal at a frequency $f_{DIG}$ for operation of the digital components, where the local oscillator signal and/or a reference signal from which the local oscillator signal is derived are generated such that digital spurs lie outside a band selected by the receiver.

16 Claims, 6 Drawing Sheets

RF DIGITAL SPUR REDUCTION

This application claims the priority under 35 U.S.C. §119 of European patent application no. 10290226.9, filed on Apr. 30, 2010, the contents of which are incorporated by reference herein.

The invention relates to reduction of spurs in RF transceivers having mixed digital and analogue RF circuitry, with particular relevance to circuitry based on CMOS technology.

Modern RF transceivers tend to make extensive use of digital designs for various functions including integrated circuit communication protocols, calibration algorithms and regulation algorithms. In integrated RF transceivers, digital and analogue modules have to be designed to work correctly together on the same die as part of the same integrated circuit. Many constraints for such designs are as a result of the analogue parts. In particular, the performance of the analogue part of an integrated RF transceiver is very much dependent on the quality of the signals input to the analogue circuitry, which can be affected by noise resulting from the digital part of the transceiver. Any digital commutation spur, or spurious spectral line, that falls into the RF band of interest will be treated by the analogue part as an RF signal, and would be amplified along with the signal of interest. A direct consequence of this would be a poor signal to noise ratio, resulting in poor performance.

A schematic illustration of a receiver part 100 of an integrated analogue and digital RF transceiver is shown in FIG. 1. An RF signal is received at an antenna 101, and the signal is amplified by amplifiers 102, 103, bandwidth limited by a filter 104 and mixed using a mixer 105 having a local oscillator signal LO. A resulting intermediate frequency signal is bandwidth limited by a further filter 106 and an IF output signal IFout is provided, which is then provided to other parts of the circuit for demodulation and processing.

Along with the analogue components 101-106, the receiver 100 comprises digital components 107, which may include components such as a phase-locked loop (PLL), an analogue to digital converter (ADC) and a digital to analogue converter (DAC). These digital components will tend to generate spurious spectral lines, or spurs 108, which can interfere with the analogue components 101-106 at various points.

In such a receiver, when a spur signal 108, or one or more of its harmonic components, at a frequency $f_{spur}$ interferes with the analogue signal in any block before the mixer 105, the spur signal 108 will also mix with the LO signal (having a frequency $f_{LO}$), resulting in a spur in the intermediate frequency output at a frequency of $f_{spur}-f_{LO}$. In the case of the receiver 100 being an infradyne receiver, if the IF spectrum is filtered with a low pass filter 106 having a bandwidth $f_{bw\_IF}$, then any spur frequency within the range of $f_{LO}-f_{bw\_IF}$ to $f_{LO}$ will be visible in the output IF signal IFout. In the case of a supradyne receiver, this range will be $f_{LO}$ to $f_{LO}+f_{bw\_IF}$.

Although other technologies are possible, area constraints as well as process constraints in integrated circuit designs tend to often lead to consideration of digital designs using CMOS technology. CMOS logic is an asymmetrical logic type, meaning that most commutation spurs remain uncompensated in the power supplies or in the ground. This would not generally be the case with differential logic types such as Current Mode Logic, Emitter Coupled Logic or Source Coupled Logic, but in such alternative types the area required on an integrated circuit tends to be larger.

In conventional circuit designs, CMOS parts need to be isolated from any analogue parts of the integrated circuit, so that the commutation spurs do not fall into analogue blocks, as this can result in undesirable amplified signals. Various isolation techniques are known to address this, such as the use of separate power supplies, deep-N well or triple well isolation, optimising of clock trees or positioning digital parts further away from any critical analogue blocks such as voltage controlled oscillators (VCOs) or low noise amplifiers (LNAs). The use of a well defined power supply strategy can also ensure that there is no undesirable current loop that could eventually be closed through the PCB wires back into RF grounds or supplies.

However, RF transceivers sometimes have to deal with very small input power signals, making them more sensitive to spurs. Even when using isolation techniques such as those mentioned above, digital spurs falling into the analogue RF signal processing chain can be a problem, as the ratio between the RF signal to the spur signals may be too high.

Other techniques to reduce or mitigate the spurs are also known, such as spreading clock frequencies via FM modulators, sigma delta modulators, or with randomizing techniques that tend to spread the harmonics. These techniques, however, may be insufficient by themselves to reduce the effect of spurs below a desired level. Other techniques for reducing the effect of spur signals are consequently also required.

It is an object of the invention to address one or more of the above mentioned problems.

According to a general aspect, the invention relates to an integrated radiofrequency transceiver circuit having digital components and analogue components, the circuit comprising:

a radiofrequency signal receiver comprising a local oscillator signal generator configured to provide a local oscillator signal at a frequency $f_{LO}$ and a mixer configured to combine an input radiofrequency signal with the local oscillator signal to produce an intermediate frequency signal; and a clock signal generator configured to generate a digital clock signal at a frequency $f_{DIG}$ for operation of the digital components, wherein the local oscillator signal and/or a reference signal from which the local oscillator signal is derived are generated such that spurs resulting from operation of the digital components lie outside a band selected by the receiver.

In accordance with a first aspect of the invention, there is provided an integrated radiofrequency transceiver circuit having digital components and analogue components, the circuit comprising:

a radiofrequency signal receiver comprising a local oscillator signal generator configured to provide a local oscillator signal at a frequency fw and a mixer configured to combine an input radiofrequency signal with the local oscillator signal to produce an intermediate frequency signal;

a clock signal generator configured to generate a digital clock signal at a frequency $f_{DIG}$ for operation of the digital components, wherein the clock signal generator is configured to derive the clock signal from the local oscillator signal such that $$f_{DIG} = \frac{f_{LO}}{N},$$

where N is a positive integer.

An advantage of the invention is that analogue components of the circuit are protected from the effect of spurs resulting from digital components of the circuit by ensuring any spurs are kept away from the intermediate frequency band. In particular, by ensuring that the local oscillator signal is an integer multiple of the digital clock frequency, any harmonic of the digital clock signal at the integer multiple will fall at the local oscillator frequency, resulting in the spur signal being mixed to DC in the intermediate frequency signal.

The circuit will typically comprise an intermediate frequency filter connected to an output of the mixer to filter the intermediate frequency signal to a bandwidth $f_{IF\_bw}$, wherein $f_{DIG} > f_{IF\_bw}$. Any higher harmonics of the digital clock frequency will tend to fall outside the intermediate frequency bandwidth and can be filtered out through the use of a low pass filter.

Consequently, the invention allows for the effect of any spurs resulting from the digital components of the circuit to be minimised, and the signal to noise ratio of the resulting IF signal improved.

According to a second aspect of the invention there is provided a method of generating a digital clock signal in an integrated radiofrequency transceiver circuit according to the first aspect, the method comprising:

the local oscillator signal generator generating the local oscillator signal at the frequency $f_{LO}$;

providing the local oscillator signal to the mixer;

the mixer combining an input radiofrequency signal with the local oscillator signal to produce an intermediate frequency signal;

the clock signal generator generating the digital clock signal at a frequency $f_{DIG}$ for operation of the digital components, wherein the digital clock signal is derived by the clock signal generator from the local oscillator signal such that $$f_{DIG} = \frac{f_{LO}}{N},$$

where N is a positive integer.

According to a third aspect of the invention there is provided an integrated radiofrequency transceiver circuit configured to receive channels at first and second different selected frequency bands, the circuit comprising first and second radiofrequency signal receivers for receiving the channels at the respective selected frequency bands, the receivers comprising a local oscillator signal generator configured to provide respective first and second local oscillator signals at frequencies $f_{LO1}, f_{LO2}$ and respective first and second mixers configured to combine an input radiofrequency signal with the respective local oscillator signals to produce respective first and second intermediate frequency signals, the circuit further comprising:

a clock signal generator configured to generate a digital clock signal at a frequency $f_{DIG}$ for operation of the digital components, wherein the clock signal generator is configured to derive the digital clock signal from division of a multiple of the first local oscillator signal such that higher harmonics of the digital clock signal lie outside the second selected frequency band.

The multiple of the first local oscillator signal preferably has a frequency higher than the second selected frequency band.

The first and second frequency bands are preferably defined by respective first and second intermediate frequency filters configured to receive the respective first and second intermediate frequency signals and each having filter bandwidths $f_{IF\_bw}$.

The clock signal generator may be configured to select the multiple of the first local oscillator signal and division of the multiple of the first local oscillator signal such that $$\left| i \frac{Mf_{LO1}}{N} - f_{LO2} \right| > f_{IF\_bw}$$

for all integer values of i greater than 1, where $Mf_{LO1}$ is the frequency of the multiple of the first local oscillator signal and N is a positive integer.

According to a fourth aspect of the invention there is provided a method of generating a digital clock signal in an integrated radiofrequency transceiver circuit according to the third aspect, the method comprising:

the local oscillator signal generator generating first and second local oscillator signals at frequencies $f_{LO1}, f_{LO2}$;

providing the first and second local oscillator signals to the respective first and second mixers;

the first and second mixers combining an input radiofrequency signal with the respective local oscillator signals to produce respective first and second intermediate frequency signals;

the clock signal generator generating a digital clock signal at a frequency $f_{DIG}$ for operation of the digital components, wherein the digital clock signal is generated from division of a multiple of the first local oscillator signal such that higher harmonics of the digital clock signal lie outside the second selected frequency band.

As with the first and second aspects, an advantage of the third and fourth aspects of the invention is that any spurs resulting from the digital clock signal will lie outside the channels of interest and can therefore be filtered out by an intermediate frequency filter.

According to a fifth aspect of the invention there is provided an integrated radiofrequency transceiver circuit having digital components and analogue components, the circuit comprising:

a fixed frequency oscillator configured to generate a fixed frequency signal at a frequency $f_{XTAL}$;

a reference signal generator configured to provide a reference signal at a frequency $f_{REF}$ from division of the fixed frequency signal;

a local oscillator signal generator configured to provide a local oscillator signal having a frequency $f_{LO}$ from multiplication of the reference signal;

a radiofrequency signal receiver comprising a mixer configured to combine an input radiofrequency signal with the local oscillator signal to produce an intermediate frequency signal and a filter having a filter bandwidth $f_{if\_bw}$, the filter connected to an output of the mixer, wherein the reference signal generator is configured to generate the reference signal such that all harmonics of the reference signal lie outside a selected band defined by the local oscillator signal frequency and the filter bandwidth.

The reference signal frequency may be $$f_{REF} = \frac{f_{XTAL}}{N + \alpha},$$

where R is a positive integer and $\alpha < 1$, the reference signal generator being configured to select a value for $R + \alpha$ such that $$\left| i \frac{f_{XTAL}}{R+\alpha} - f_{LO} \right| > f_{IF\_bw}$$

for all positive integer values of i greater than 1.

The reference signal generator may be configured to adjust the value of α such that higher harmonics of the reference signal at the frequency $$f_{REF} = \frac{f_{XTAL}}{R+\alpha}$$

lie outside the selected band.

The reference signal generator may be configured to adjust the value of a in discrete steps between 0 and 1.

In a first embodiment, the reference signal generator comprises:

a divider module and a complex filter module, each configured to receive the fixed frequency signal from the fixed frequency oscillator; and a single sideband mixer configured to receive in-phase and quadrature output signals from the divider and complex filter modules and provide the reference signal.

The complex filter module may be a polyphase filter module. The single sideband mixer may be a harmonic reject single sideband mixer.

With the divider module considered a first divider module, the complex filter module a first complex filter module and the single sideband mixer a first single sideband mixer, the transceiver may further comprise:

a second divider module configured to receive the fixed frequency signal from the fixed frequency oscillator;

a second complex filter module configured to generate in-phase and quadrature signals from the output signal of the first single sideband mixer; and a second single sideband mixer configured to receive in-phase and quadrature output signals from the second divider module and second single sideband mixer and to generate the reference signal output.

In a second embodiment, the reference signal generator comprises:

a dual modulus divider module configured to receive the fixed frequency signal from the fixed frequency oscillator and to divide the fixed frequency signal according to one of two integer values N and N+1; and a sigma-delta modulator configured to provide a signal to the divider module to select one of the modulus values k times out of each q cycles such that the divider module outputs the reference signal at a frequency $$f_{REF} = \frac{f_{XTAL}}{N+k/q}.$$

According to a sixth aspect of the invention there is provided a method of generating a reference signal in an integrated radiofrequency transceiver circuit according to the fifth aspect, the method comprising:

the fixed frequency oscillator generating the fixed frequency signal at a frequency $f_{xTAL}$;

the reference signal generator providing the reference signal at a frequency $f_{REF}$ from division of the fixed frequency signal;

the local oscillator signal generator providing the local oscillator signal having a frequency $f_{LO}$ from multiplication of the reference signal;

the mixer combining an input radiofrequency signal with the local oscillator signal to produce an intermediate frequency signal; and the filter filtering the intermediate frequency signal to the filter bandwidth $f_{if\_bw}$, wherein the reference signal generator generates the reference signal such that all harmonics of the reference signal lie outside the selected band defined by the local oscillator signal frequency and the filter bandwidth.

An advantage of the fifth and sixth aspects of the invention is that the choice of α ensures that harmonics of the reference frequency do not fall into the desired channel of the RF band, as defined by the bandwidth of the filter and the local oscillator frequency. Any spurs resulting from the digital components of the circuit will therefore lie outside the desired channel.

The invention is described in more detail below by way of illustrative exemplary embodiments, with reference to the accompanying drawings in which.

DETAILED DESCRIPTION OF EMBODIMENTS

Figure 1:
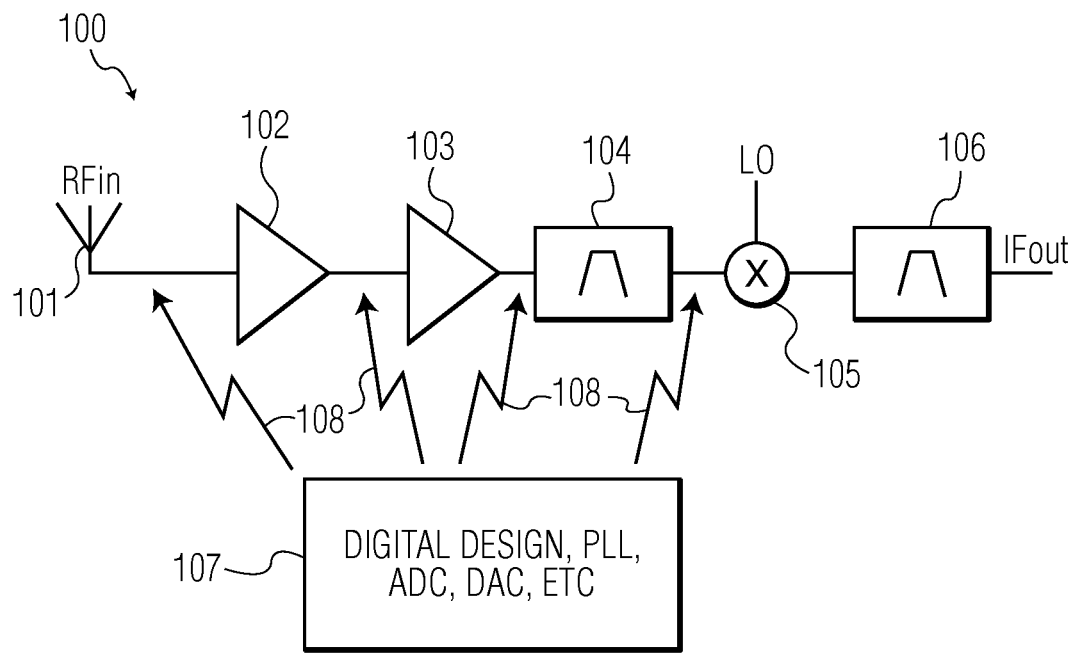
FIG. 1 is a schematic diagram of a receiver part of an integrated digital and analogue RF transceiver.

The RF receiver 100 illustrated in FIG. 1 has been described above as part of the background to the invention.

The following defined terms are used in the description of exemplary embodiments provided herein:

$f_{LO}$: the frequency of the local oscillator signal provided to the mixer in an RF receiver chain. The local oscillator signal is typically output by a frequency synthesizer.

$f_{RF}$: the frequency of the RF signal input to the mixer of the RF receiver. This corresponds to the RF signal intended to be received.

$f_{IF}$: the frequency of a signal provided at the output of the mixer, also known as the intermediate frequency signal. If the mixer is symmetrical the intermediate frequency can be defined as being at either $f_{LO}+f_{RF}$ or $f_{RF}-f_{IF}$. In some systems, however, the mixer may deal only with the left or the right side of the RF spectrum. Such mixers are termed complex mixers.

$f_{REF}$: the frequency of a reference signal used as a precise and low noise reference for the local oscillator signal synthesizer. Generally, $f_{LO}=Nf_{REF}$, where N is a rational number.

$f_{DIG}$: the frequency of the digital clock signal used to clock the digital components of the circuit.

Both $f_{DIG}$ and $f_{REF}$ are typically at low frequencies compared with the frequencies of the RF signals being received, typically in the range of a few tens of MHz as compared with the RF signals in the region of GHz. However, since these are digital signals, their form will be close to being square waves, with a resulting effect that harmonics of the signals can show a high level up to the GHz region, which may be in the range of the RF signals to be received.

The main features of the invention relate to the relationships between the frequencies $f_{DIG}$ or $f_{REF}$ and $f_{LO}$, these relationships being defined such that any spurs resulting from operation of digital components of the circuit have a reduced or minimal effect on the RF signal to be received.

Figure 2:
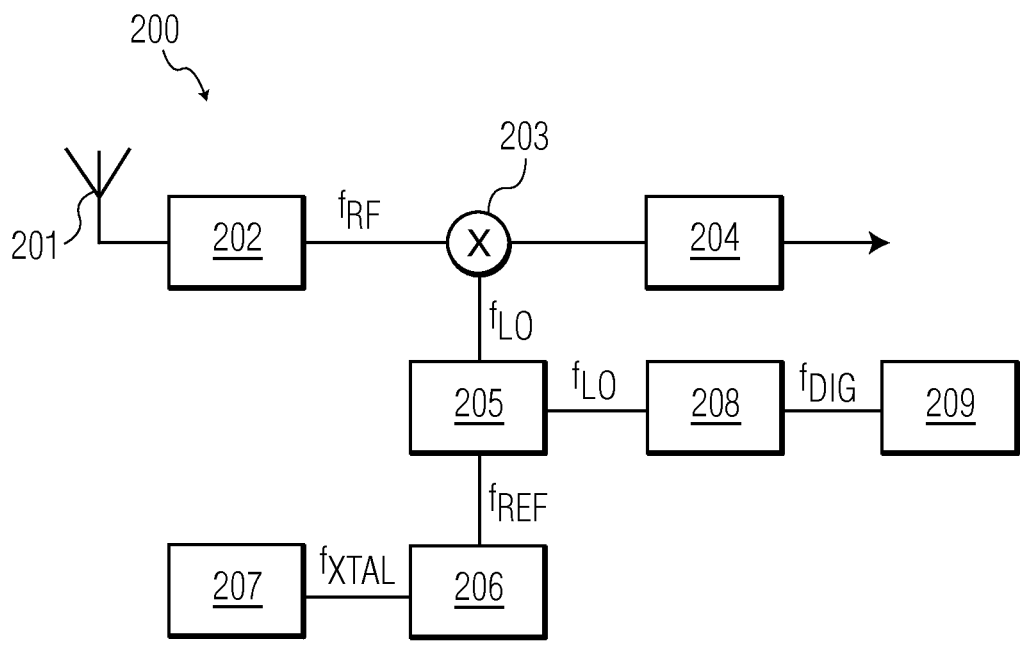
FIG. 2 is a schematic diagram of an exemplary single channel receiver circuit having analogue and digital components.

Shown in FIG. 2 is a schematic diagram of an integrated radiofrequency transceiver circuit 200 having digital components 209 and analogue components 201, 202, 203, 204. The circuit 200 comprises a radiofrequency signal receiver comprising an antenna 201 connected to an input stage 202, which may for example contain a low noise amplifier and input stage filter. The input stage 202 provides an RF signal to a mixer 203, which mixes the RF signal comprising a frequency $f_{RF}$ with a local oscillator signal at a frequency $f_{LO}$, which is generated by a local oscillator generator 205. An output signal at an intermediate frequency is provided to a filter 204, which limits the bandwidth of the intermediate frequency signal and provides an output IF signal for further processing by other components of the circuit 200.

The circuit also comprises a reference signal generator 206, which derives a reference signal at a frequency $f_{REF}$ from a fixed frequency signal source 207, which provides a signal at a frequency $f_{XTAL}$. The fixed frequency source 207 may for example comprise a crystal oscillator.

In the embodiment shown in FIG. 2, the local oscillator signal generator 205 provides the local oscillator signal at the frequency $f_{LO}$ to both the mixer 203 and to a clock signal generator 208, which generates a clock signal at a frequency $f_{DIG}$ to the digital components 209 of the circuit 200. As will be seen below, the clock signal generator 208 and local oscillator generator 205 may be provided by a common circuit.

Considering the digital clock signal frequency $f_{DIG}$, this may be chosen to be a sub-harmonic of the local oscillator signal, such that the relationship between the two signals is defined by:

$$f_{DIG} = \frac{f_{LO}}{N} \quad (1)$$

where N is a positive integer.

There are at least two advantages to making the digital clock signal a sub-harmonic of the local oscillator signal. A first advantage results from the $N^{th}$ harmonic of $f_{DIG}$ always falling at the frequency $f_{LO}$. The equivalent spur is consequently transposed to DC on the intermediate frequency side of the mixer, because $f_{IF}=f_{LO}-f_{LO}=0$ Hz. Because of the typically very small level of spurs, the impact on the DC bias of the IF stages will tend to be negligible, even in an architecture that uses a low intermediate frequency. In any case, the use of AC coupling after the IF mixer will remove any such DC components should they be significant.

A second advantage is that, provided the digital clock frequency is higher than the bandwidth of the selected channel, i.e. $f_{DIG}>f_{bw\_IF}$, then the $(N\pm1)^{th}$ harmonic of the digital clock signal falls at $f_{LO}\pm f_{DIG}$, and is thus rejected by a low pass filter in the IF path after the mixer.

Figure 3:
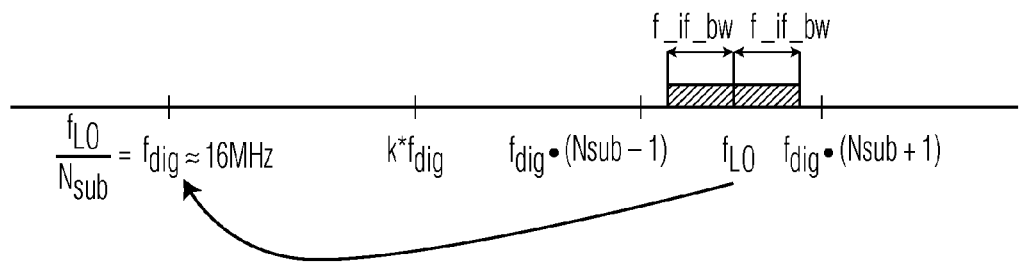
FIG. 3 is a schematic diagram illustrating a relationship between a local oscillator signal and a derived digital clock signal.

FIG. 3 illustrates schematically the relationship between the local oscillator signal frequency $f_{LO}$ and the digital clock signal frequency $f_{DIG}$. The digital clock signal frequency is shown to be a sub-harmonic of the local oscillator signal frequency, at a frequency defined by $f_{LO}/N_{sub}$, where $N_{sub}$ is a positive integer. Harmonics of the digital clock signal will appear at multiples of $f_{DIG}$, i.e. at frequencies equal to $kf_{DIG}$. Provided the digital clock signal frequency is greater than the bandwidth of the selected channel $f_{IF\_bw}$, harmonics of the digital clock signal either side of the local oscillator signal, i.e. harmonics at frequencies $kf_{DIG}$ where k is $N_{sub}-1$ and $N_{sub}+1$, will lie outside the selected channel that is defined by the local oscillator frequency and the bandwidth $f_{IF\_bw}$.

Figure 4:
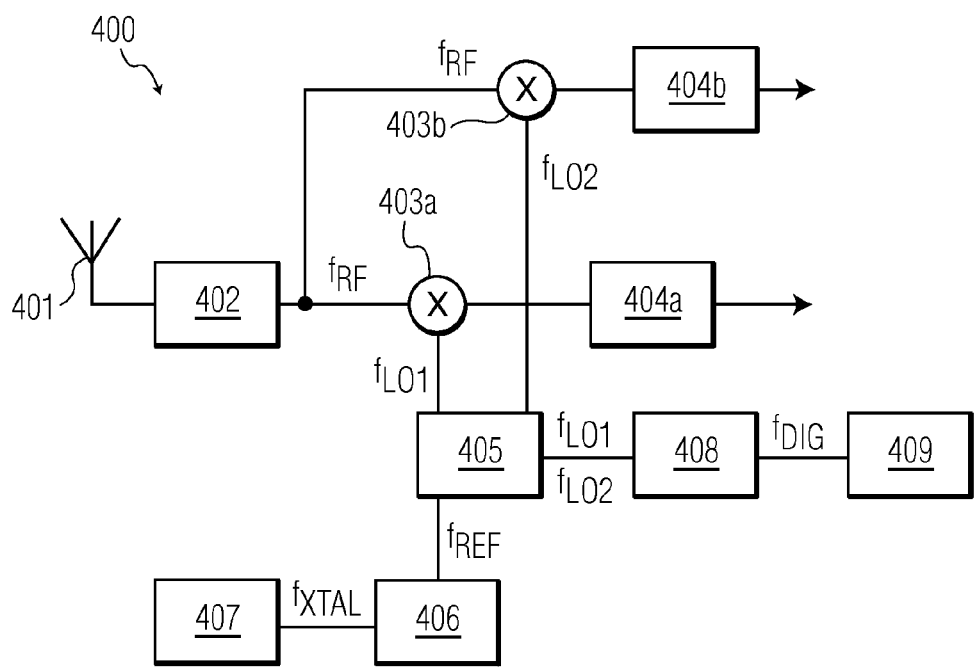
FIG. 4 is a schematic diagram of an exemplary two channel receiver circuit having analogue and digital components.

According to embodiments falling within the second aspect of the invention, an integrated radiofrequency transceiver can be configured to receive two separate channels at different frequencies while, as with the embodiment falling within the first aspect of the invention described above, still ensuring that harmonics of a digital clock signal derived from a local oscillator signal do not fall within either channel. An example of such a multi-channel receiver 400 is illustrated in FIG. 4. As with the receiver 200 of FIG. 2, the multi-channel receiver 400 comprises an aerial 401, an input stage 402, a fixed frequency signal generator 407, a reference frequency signal generator 406, a local oscillator signal generator 405, a digital clock signal generator 408 and digital components 409. In this case, the receiver 400 comprises first and second mixers 403a, 403b and first and second intermediate frequency filters 404a, 404b. The mixers 403a, 403b are provided with an input radiofrequency signal $f_{RF}$ and with respective first and second local oscillator signals at frequencies $f_{LO1},f_{LO2}$ from the local oscillator signal generator 405.

The digital clock signal generator 408 is provided with the local oscillator signals and derives a digital clock signal having a frequency $f_{DIG}$ from one of these local oscillator signals. If the first local oscillator signal is chosen, and the digital clock signal is derived according to the embodiment of FIG. 2, the digital clock signal will have a frequency $f_{DIG}$ of $f_{LO1}/N$. This ensures that no harmonics of the digital clock signal fall within the first selected band defined by the first local oscillator signal. However, in this case since the first and second bands can be chosen independently, this does not ensure that there are no harmonics falling within the second band. To address this problem, the following criteria can be used to ensure that harmonics do not fall within either selected band.

Firstly, a multiple of the first local oscillator signal is defined using a multiplier M such that $Mf_{LO1}$ is higher than the second selected band, i.e. has a frequency above the channel defined by the second local oscillator signal and the bandwidth of the second filter 404b.

Secondly, the multiple of the first local oscillator signal is divided by an integer N to generate the digital clock signal such that $$\left| i\frac{Mf_{LO1}}{N} - f_{LO2} \right| > f_{IF\_bw} \quad (2)$$

for all integer values i greater than 1, where $f_{IF\_bw}$ is the bandwidth of the second filter 304b (which will typically be the same as the bandwidth of the first filter 304a).

In other words, the digital clock signal generator 308 is configured to derive the digital clock signal from division of a multiple of the first local oscillator signal such that higher harmonics of the digital clock signal lie outside the second selected frequency band.

Figure 5:
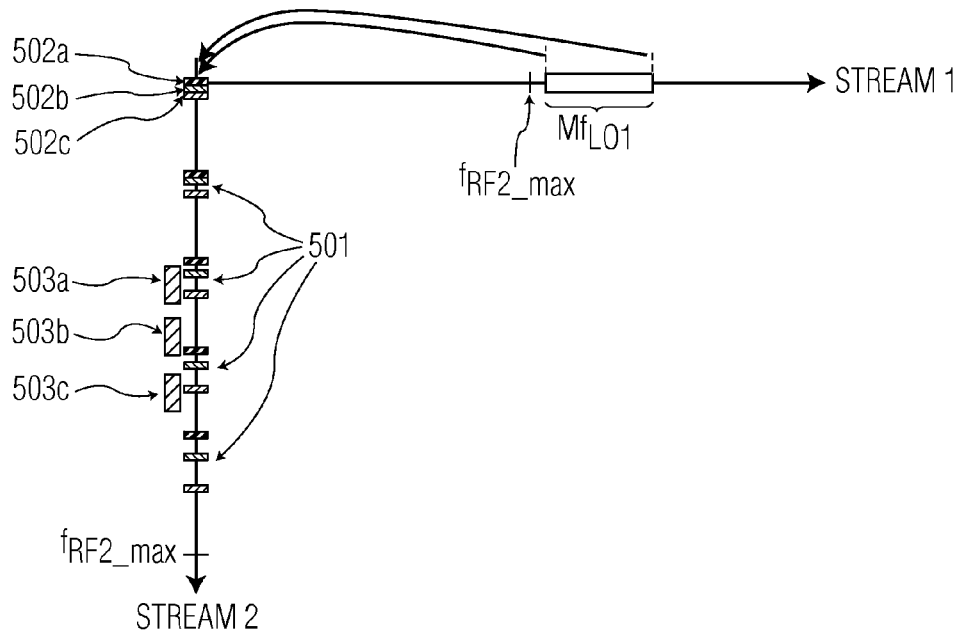
FIG. 5 is a schematic diagram illustrating a comparison between harmonics of a range of digital clock signals derived from a multiple of a first local oscillator signal defining a first channel and a range of possible second channels.

This principle of operation is further illustrated in FIG. 5. The two channels, or streams, are indicated on orthogonal axes, with stream 1 (the first channel) on the x axis and stream 2 (the second channel) on the y axis. The multiplied first local oscillator frequency is shown at a frequency $Mf_{LO1}$ just above the maximum possible frequency of the second selected RF channel, $f_{RF2\_max}$. The multiplied first local oscillator frequency is used to generate the digital clock frequency. Three different candidate frequencies 502a, 502b, 502c are indicated in FIG. 5, representing different values for the divisor N as applied to the multiplied first local oscillator frequency. Depending on the location of the second channel, which may for example be at different locations indicated by alternative bands 503a, 503b, 503c, one or more of the candidate frequencies may result in harmonics 501 that lie within the second channel. In the case of the first alternative band 503a, harmonics from the second and third candidate frequencies 502b, 502c lie within the band 503a, so the first candidate frequency 502a would be chosen. In the case of the second alternative band 503b, harmonics from both the second and third candidate frequencies 502b, 502c lie outside the band, while a harmonic from the first candidate frequency 502a lies within the band, so either of the second or third candidate frequencies 502b, 502c could be chosen. In the case of the third alternative band 503c, a harmonic from the third candidate frequency 502c lies within the band 503c, so either of the first or second candidate frequencies 502b, 502c could be chosen.

In accordance with embodiments falling within the third embodiment of the invention, the reference signal frequency $f_{REF}$, generated by the reference signal generator 206, 406 (FIGS. 2, 4), may be made programmable in such a way that any harmonics of the reference frequency do not fall into a desired RF band (i.e. the wanted channel). This can be described by the following equation:

$$f_{REF} = \frac{f_{XTAL}}{N + \alpha} \quad (3)$$

where $f_{XTAL}$ is a fixed frequency higher than $f_{REF}$, R is a positive integer and $|\alpha|<1$.

Provided the steps between two consecutive values of $|\alpha|$ are sufficiently small, it is possible to find a value for $\alpha$ such that the following relation holds:

$$i\frac{f_{XTAL}}{N + \alpha} - f_{LO} < f_{IF\_bw} \quad (4)$$

for any positive integer i greater than 1.

According to this embodiment, the reference frequency signal generator 206, 406 may be configured to generate the reference signal provided to the local oscillator signal generator 205, 405 by dividing the fixed frequency signal provided by the fixed frequency signal generator 407 at the frequency $f_{XTAL}$ by the fractional ratio R+α such that the above relationship holds for any value of i.

Figure 6:
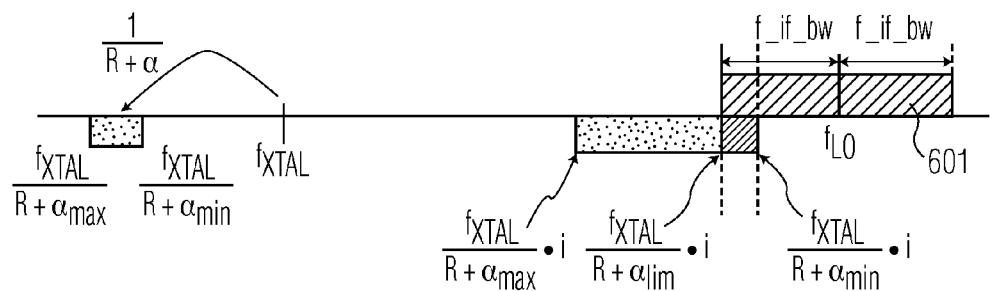
FIG. 6 is a schematic diagram illustrating a preferred choice of divisor for generating a reference signal from a fixed frequency signal.

FIG. 6 illustrates schematically the principle of the above described embodiment. The fixed frequency $f_{XTAL}$ is used to generate a reference frequency by division. Given the possible range for α, which may be from 0 to 1, and a given value for the integer R, the derived reference frequency may vary between $$\frac{f_{XTAL}}{R + \alpha_{max}}$$

at a lower end and $$\frac{f_{XTAL}}{R + \alpha_{min}}$$

at a higher end. Varying the value for a between the values of $\alpha_{max}$ and $\alpha_{min}$ allows for adjustment of the reference signal such that any harmonics lie outside the selected band indicated by the local oscillator signal frequency $f_{LO}$ and the intermediate frequency bandwidth $f_{IF\_bw}$. If the range of frequencies indicated by an integer multiple of the range of possible frequencies for the reference signal overlaps the selected band 601, a first portion of this range, from $$\frac{f_{XTAL}}{R + \alpha_{max}}i \text{ to } \frac{f_{XTAL}}{R + \alpha_{lim}}i$$

is outside the selected band, while a second portion of the range, from $$\frac{f_{XTAL}}{R + \alpha_{lim}}i \text{ to } \frac{f_{XTAL}}{R + \alpha_{min}}i$$

is within the selected band 601. The value for a should therefore be chosen such that $\alpha>\alpha_{lim}$ in order to avoid any harmonics from the reference signal falling within the selected band 601. In other words, with reference to the embodiment of FIG. 2, the reference signal generator 206 is configured to generate the reference signal such that all harmonics of the reference signal lie outside a selected band defined by the local oscillator signal frequency and the filter bandwidth, i.e. the bandwidth defined by filter 204.

Figure 7:
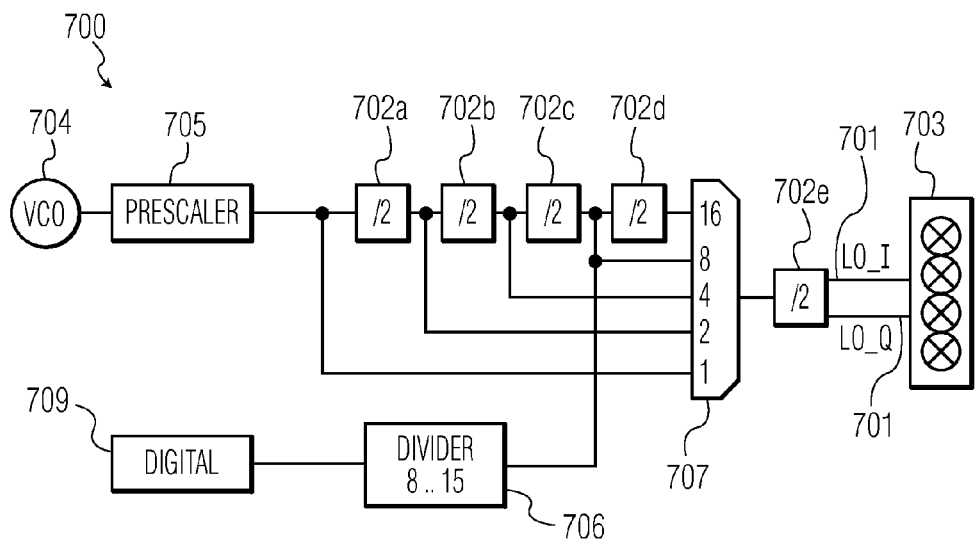
FIG. 7 is a schematic diagram of a circuit for generating a digital clock signal and a local oscillator signal from a common reference signal.

FIG. 7 shows a schematic circuit for an exemplary embodiment of a clock signal and local oscillator generator 700, which is equivalent to the local oscillator signal generator 205 and clock signal generator 208 of FIG. 2, in which the local oscillator signal output LO 701 (comprising in-phase and quadrature components LO_I, LO_Q) is obtained from the output of a sequence of divide-by-two blocks 702a-e and provided to a mixer 703. An input reference signal for the divide-by-N part of the circuit 700 is provided by a voltage-controlled oscillator 704 and prescaler 705. The number of divisions of the prescaled input signal can be chosen according to an input selection of a multiplexer 707 connected to each of the divide-by-two blocks 702a-d. The input reference signal from the VCO 704 can be held fixed because all the dividers in the circuit are integer dividers, such that any resulting harmonics will always fall at the local oscillator signal frequency $f_{LO}$.

The digital components 709 of the circuit 700 are provided a clock signal from a further divider 706, which receives as an input one of the divided signals from the sequence of divide-by-two blocks 702*a-e* and further divides the frequency of the received signal.

In typical embodiments on an integrated circuit, a frequency range of the digital clock signal may be in the region of 14.5 to 17.5 MHz, i.e. with an adjustable range of 10% or less. Maintaining a small adjustable range ensures that any time constants of the algorithms carried out by the digital components can be met.

The divider 706, in combination with the prescaler 705 and multiplexer 707, allows for a large range of division values to be used. The resulting digital clock frequency may be selected such that the difference between the digital clock frequency and an optimum clock frequency is minimised.

Figure 8A:
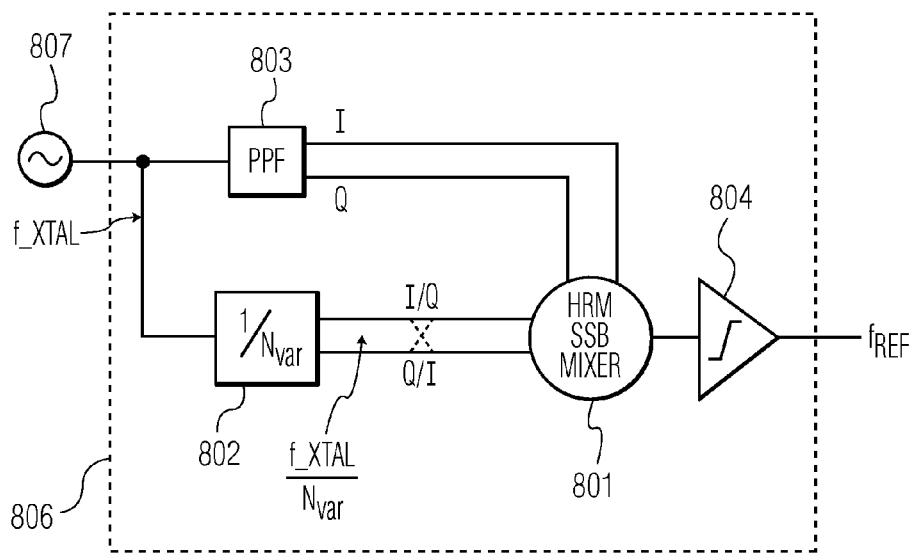
FIG. 8a is a schematic diagram of a first embodiment of a reference signal generator.

An exemplary embodiment of a reference signal generator 206 (FIG. 2) for generating the reference signal at a frequency $f_{REF}$ is illustrated in FIG. 8*a*. A crystal oscillator 807 provides an input fixed frequency signal to the reference signal generator circuit 806. The fixed frequency signal $f_{XTAL}$ is provided to a divider module 802 and to a complex filter such as a PPF (polyphase filter) module 803. The complex filter may be provided by means other than a polyphase filter module 803, for example using a phase shifter module such as a delay-locked loop (DLL), provided that the module is able to produce I and Q signals from an input signal. The divider and polyphase filter modules each provide in-phase and quadrature outputs to an HRM SSB (harmonic reject, single sideband) mixer 801. The PPF module 803 creates signals with relative phases 0°, 90°, 180° and 270° from an input signal having only two phases at 0° and 180°. The HRM SSB mixer 801 generates an output signal at a frequency $f_1-f_2$ and no signal at $f_2-f_1$, (where $f_2$ and $f_1$ are different input signal frequencies) which is important in applications where only a single frequency output is required. The mixer 801 provides an output signal to an amplifier 804, which outputs the reference signal at the frequency $f_{REF}$. In this embodiment, since the reference frequency $f_{REF}$ is obtained by means of the Single Side Band mixer 401 in order to generate a single frequency output, by swapping the in-phase and quadrature signal inputs I and Q to the mixer 801, the output of the reference signal generator 806 can be chosen to be either $$f_{XTAL}\left(1 + \frac{1}{N_{var}}\right) \text{ or } f_{XTAL}\left(1 - \frac{1}{N_{var}}\right),$$

where $N_{var}$ is the integer divisor applied by the divider 802.

The output frequency of this circuit is $$f_{XTAL}\left(1 \pm \frac{1}{N_{var}}\right).$$

Hence, from equation (3), and considering that R=1, we can say that $$\frac{1}{1+\alpha} = 1 \pm \frac{1}{N_{var}}.$$

As $N_{var}$ is an integer, the possible values of α that can be generated are those given by this equality.

Figure 8B:
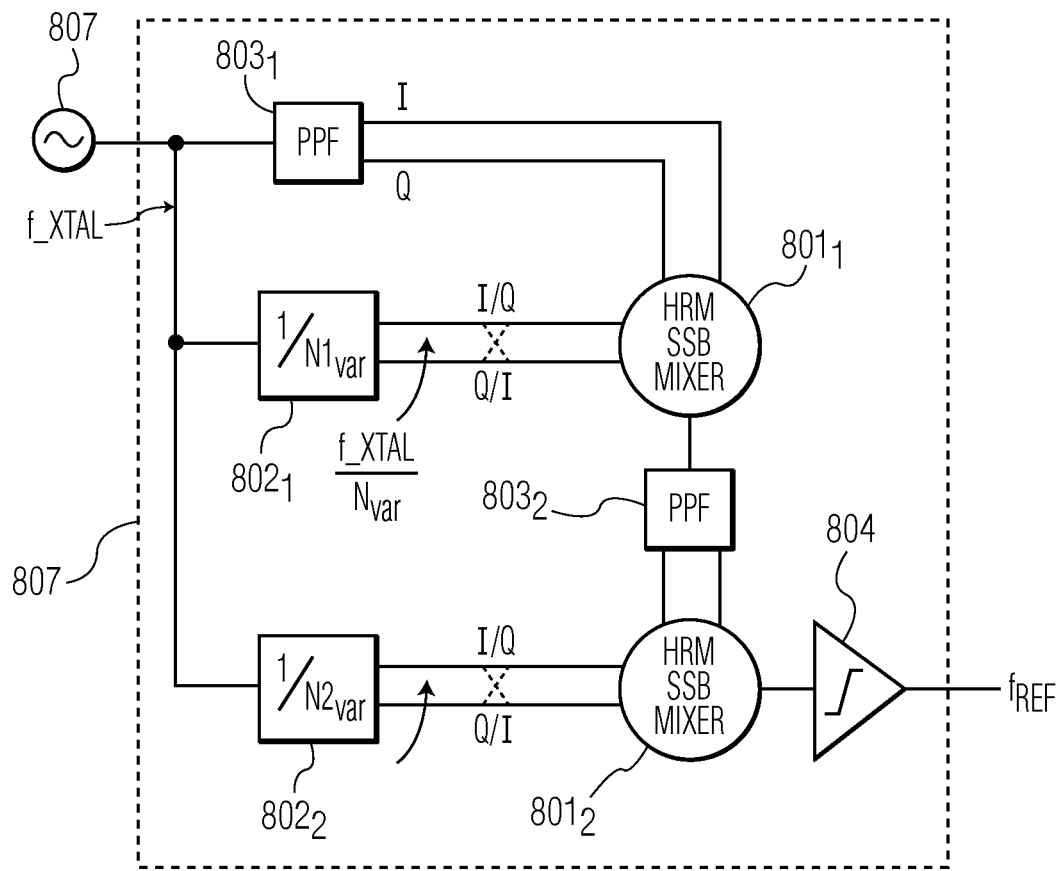
FIG. 8b is a schematic diagram of an alternative first embodiment of a reference signal generator.

An alternative to this arrangement could also be provided in order to increase the number of possible values for α. For instance, the output signal from the mixer 801 could itself be mixed with another low frequency signal obtained by a second frequency divider dividing the fixed frequency $f_{XTAL}$ by a second integer $N2_{var}$ in such a way that the new output frequency becomes $$f_{XTAL}\left(1 \pm \frac{1}{N1_{var}} \pm \frac{1}{N2_{var}}\right),$$

where $N1_{var}$ is the first integer divisor. This is illustrated in FIG. 8*b*, in which the output from a first mixer 801$_1$ is provided to a second polyphase filter 803$_2$, and the fixed frequency signal is provided to a second divider module 802$_2$. Outputs from the second polyphase filter 803$_2$ and second divider module 802$_2$ are combined in a second mixer 801$_2$ to provide an output reference signal at a frequency $f_{REF}$, which may be amplified by amplifier 804.

Extending this further, a chain of m mixers, dividers and complex filters can be used such that the final output frequency $f_{REF}$ is given by $$f_{XTAL}\left(1 \pm \frac{1}{N1_{var}} \pm \frac{1}{N2_{var}} \pm \ldots \pm \frac{1}{Nm_{var}}\right).$$

An advantage of providing further divider, filter and mixer modules is that a greater number of values for the output reference frequency $f_{REF}$ can be chosen by altering the values for $N1_{var}$, $N2_{var}$, $Nm_{var}$.

The division by $1/N_{var}$ can be carried out by a simple frequency divider (with $N_{var}$ being an integer), as in the embodiment of FIG. 7, or it can be achieved by Direct Digital Synthesis, the result of which will be an output closer to a pure sine wave. As a result, the number of possible harmonics combinations at the output of the mixer will be reduced, and the spectral purity of $f_{REF}$ enhanced. This is important in the scope of a frequency synthesizer, where the reference signal has to be as clean as possible. If the outputs of the polyphase filter 803 and the divider 802 are sine waves, the mixer 801 may not need to reject harmonics, since none would be present, but if the outputs are not sine waves (for example square waves), the mixer 801 is preferably a harmonic reject mixer.

The digital clock signal derived from the reference signal can be generated in the same way that the local oscillator signal is generated. A condition is to keep $f_{DIG}$ within an acceptable range, either because of the need for stable time constants in the digital components of the circuit, or because of the maximum possible frequency for the digital design in a given technology. In any case, $f_{DIG}$ can be defined as in equation (1) above, i.e. from integer division of the local oscillator signal.

Figure 9:
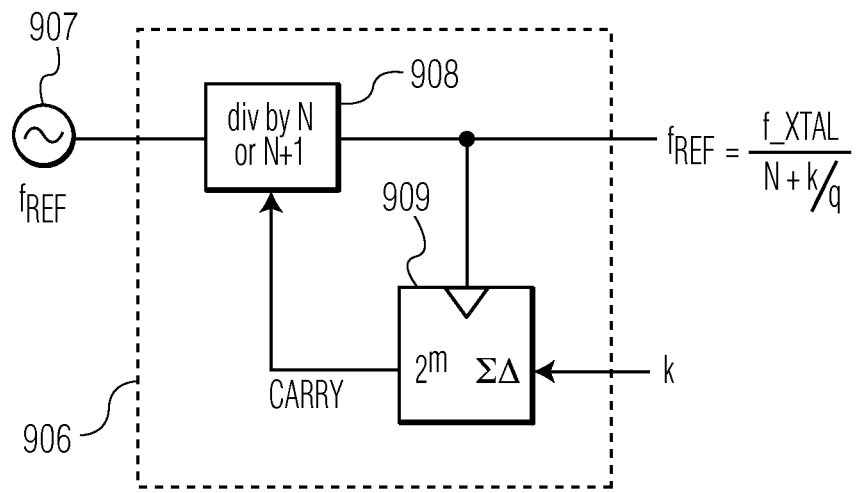
FIG. 9 is a schematic diagram of a second embodiment of a reference signal generator.

An alternative embodiment of a reference signal generator 906 for the generation of the reference signal at the frequency $f_{REF}$ is shown in FIG. 9. In this embodiment, the fractional part α is directly obtained in the time domain by modulation of a programmable divider 908. In this embodiment, the resulting spurs due to introduced short term jitter can be compensated by the synthesizer itself, either in the analogue or the digital domain.

The programmable divider 908 in this case is a dual modulus divider, meaning that when the input to the divider is 0, the divider divides by N and when the input is 1 the divider divides by N+1. The modulus signal must be stable during active edges of the input fixed frequency signal $f_{XTAL}$. The ΣΔ modulator 909 generates a bit stream of 0s and 1s at a carry output provided to the divider 908, the time average of the output being equal to the value $k/2^m$.

By clocking the modulator 909 with the output of the divider 908, at each output rising edge the modulator 909 outputs a new count target for the counter, which is either N or N+1. The time taken by the output of the modulator 909 to be updated is small compared to the output frequency of the divider 908.

As a result, the average count is $N+k/2^m$, and the output frequency is selectable based on the input value for k.

Figure 10:
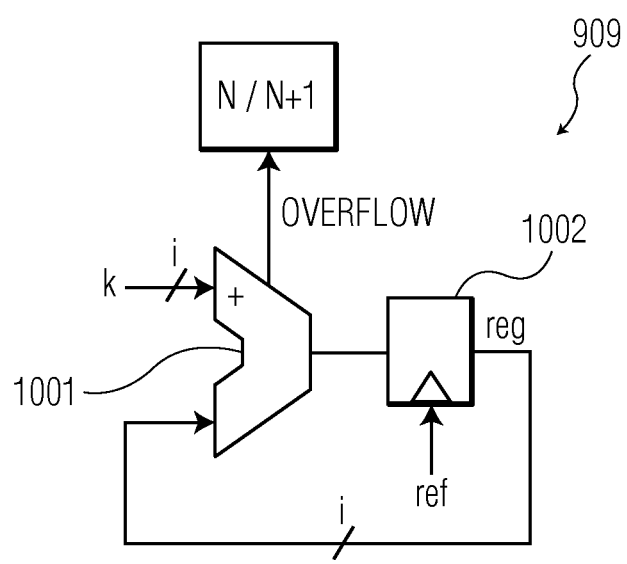
FIG. 10 is a schematic diagram of a ΣΔ modulator module for use in the reference signal generator of FIG. 9.

An exemplary embodiment of a ΣΔ modulator 909 for driving a dual modulus divider is shown in FIG. 10, in which the fractional part α is directly obtained in the time domain by modulation of a programmable divider. In this embodiment, the resulting spurs due to introduced short term jitter can be compensated by the synthesiser either in the analogue or digital domain.

A way to obtain the fractional part a in the time domain is to consider that $$\alpha = \frac{k}{q}.$$

If a digital apparatus is able to provide an output set to '1' k times over a total number of periods q, then the output average value is $$\frac{k}{q}.$$

Such an apparatus is called a ΣΔ (sigma-delta) modulator. As shown in FIG. 10, the modulator 909 comprises a 2 inputs adder 1001 and a register 1002, the output of the register 1002 being fed back to one of the inputs of the adder 1001. At each clock rising edge, the adder 1001 sums its first input k with the current register content, in such a way that reg(t+1)=reg(t)+k. As the register 1002 has a limited number of bits m, it can be fulfilled up to $2^m-1$. Hence, if reg(t+1)=reg*>$2^m-1$, then the register 1002 overflows, and its actual value reg(t+1) becomes reg*>($2^m-1$). The overflow signal is the output of the modulator 909. It can be shown that after q=$2^m-1$ periods, the overflow signal has gone to '1' k times, thereby realizing the time averaging required.

In FIG. 9, the modulator output is connected to a programmable divider or counter 908. This counter counts N periods of its input signal when the overflow is '0', and (N+1) periods of its input when the overflow is '1'. This means that during q periods of the counter, it will have counted k times (N+1) and q-k times N. As a result the time averaged count is $$\frac{(q-k)N + k(N+1)}{q} = \frac{qN+k}{q} = N + \frac{k}{q} = N + \alpha.$$

Although the total number of input periods is correct, there are abrupt phase jumps at divider output each time a new count is (N or N+1) is set. Those phase jumps are also called short term jitter. This short term jitter can be compensated either in the analog or in the digital domain, for example by the use of a PLL, a digital PLL or a jitter canceller.

Other embodiments are also within the scope of the invention, which is defined by the appended claims.

The invention claimed is:

1. An integrated radio frequency (RF) transceiver circuit having digital components and analog components, the circuit comprising:
   a fixed frequency oscillator configured to generate a fixed frequency signal at a frequency $f_{XTAL}$;
   a reference signal generator configured to generate a reference signal at a frequency $f_{REF}$ from division of the fixed frequency signal;
   a local oscillator signal generator configured to provide a local oscillator signal at a frequency $f_{LO}$ from multiplication of the reference signal; and
   a mixer configured to combine an input RF signal with the local oscillator signal to produce an intermediate frequency signal; and
   a filter having a filter bandwidth $f_{if\_bw}$, the filter connected to an output of the mixer, wherein the reference signal generator is configured to generate the reference signal such that all harmonics of the reference signal lie outside a selected band defined by both the local oscillator signal frequency and the filter bandwidth.

2. The circuit of claim 1, wherein the reference signal frequency $$f_{REF} = \frac{f_{XTAL}}{R+\alpha} f_{REF} = \frac{f_{XTAL}}{N+\alpha}.$$

3. The circuit of claim 2, wherein $$a > \frac{if_{XTAL}}{f_{if\_bw} + f_{LO}} - N,$$

R is a positive integer, and α<1.

4. The circuit of claim 2, wherein the reference signal generator is configured to select a value for R+α such that $$\left| i\frac{f_{XTAL}}{R+\alpha} - f_{LO} \right| > f_{IF\_bw}$$

for all positive integer values of i greater than 1.

5. The circuit of claim 2, wherein the reference signal generator is configured to adjust a such that higher harmonics of the reference signal at the frequency $$f_{REF} = \frac{f_{XTAL}}{R+\alpha}$$

lie outside the selected band.

6. The circuit of claim 2, wherein the reference signal generator is configured to adjust a in discrete steps between 0 and 1.

7. The circuit of claim 1, wherein the reference signal generator comprises:
   a divider module; and
   a complex filter module, each configured to receive the fixed frequency signal from the fixed frequency oscillator; and a single sideband mixer configured to receive in-phase and quadrature output signals from the divider and complex filter modules and provide the reference signal.

8. The circuit of claim 7, wherein the complex filter module is a polyphase filter module.

9. The circuit of claim 7, wherein the single sideband mixer is a harmonic reject single sideband mixer.

10. The circuit of claim 1, wherein the reference signal generator comprises:
- a dual modulus divider module configured to receive the fixed frequency signal from the fixed frequency oscillator and to divide the fixed frequency signal according to one of two integer values N and N+1; and
- a sigma-delta modulator configured to provide a signal to the divider module to select one of the modulus values k times out of each q cycles such that the divider module outputs the reference signal at a frequency $$f_{REF} = \frac{f_{XTAL}}{N + k/q}.$$

11. A method of generating a digital clock signal in an integrated RF transceiver circuit according to claim 1, the method comprising:
- the fixed frequency oscillator generating the fixed frequency signal at a frequency $f_{XTAL}$;
- the reference signal generator providing the reference signal at a frequency $f_{REF}$ from division of the fixed frequency signal;
- the local oscillator signal generator generating the local oscillator signal at the frequency $f_{LO}$ from multiplication of the reference signal;
- providing the local oscillator signal to the mixer;
- the mixer combining an input RF signal with the local oscillator signal to produce an intermediate frequency signal;
- the filter filtering the intermediate frequency signal to the filter bandwidth $f_{if\_bw}$, wherein the reference signal generator generates the reference signal such that all harmonics of the reference signal lie outside the selected band defined by the local oscillator signal frequency and the filter bandwidth.

12. An integrated radio frequency (RF) transceiver circuit configured to receive channels at first and second different selected frequency bands, the circuit comprising:
- first and second RF signal receivers for receiving the channels at the respective selected frequency bands, the receivers comprising:
  - a local oscillator signal generator configured to provide respective first and second local oscillator signals at frequencies $f_{LO1}$, $f_{LO2}$, and
  - respective first and second mixers configured to combine an input RF signal with the respective local oscillator signals to produce respective first and second intermediate frequency signals; and
- a clock signal generator configured to generate a digital clock signal at a frequency $f_{DIG}$ for operation of the digital components, wherein the clock signal generator is configured to derive the digital clock signal from division of a multiple of the first local oscillator signal such that higher harmonics of the digital clock signal lie outside the second selected frequency band.

13. The circuit of claim 12, wherein the multiple of the first local oscillator signal has a frequency higher than the second selected frequency band.

14. The circuit of claim 13, wherein the clock signal generator is configured to select the multiple of the first local oscillator signal and division of the multiple of the first local oscillator signal such that $$\left| i \frac{Mf_{LO1}}{N} - f_{LO2} \right| > f_{IF\_bw}$$

for all integer values of i greater than 1, where $Mf_{LO1}$ is the frequency of the multiple of the first local oscillator signal and N is a positive integer.

15. The circuit of claim 12, wherein the first and second frequency bands are defined by respective first and second intermediate frequency filters configured to receive the respective first and second intermediate frequency signals and each having filter bandwidths $f_{IF\_bw}$.

16. A method of generating a digital clock signal in an integrated RF transceiver circuit according to claim 12, the method comprising:
- the local oscillator signal generator generating first and second local oscillator signals at frequencies $f_{LO1}$, $f_{LO2}$;
- providing the first and second local oscillator signals to the respective first and second mixers;
- the first and second mixers combining an input RF signal with the respective local oscillator signals to produce respective first and second intermediate frequency signals;
- the clock signal generator generating a digital clock signal at a frequency $f_{DIG}$ for operation of the digital components, wherein the digital clock signal is generated from division of a multiple of the first local oscillator signal such that higher harmonics of the digital clock signal lie outside the second selected frequency band.

* * * * *